Sept. 27, 1966     A. S. CZUBAK     3,274,861
EXPANDABLE ROTARY BORING TOOL
Filed Oct. 8, 1964     2 Sheets-Sheet 2
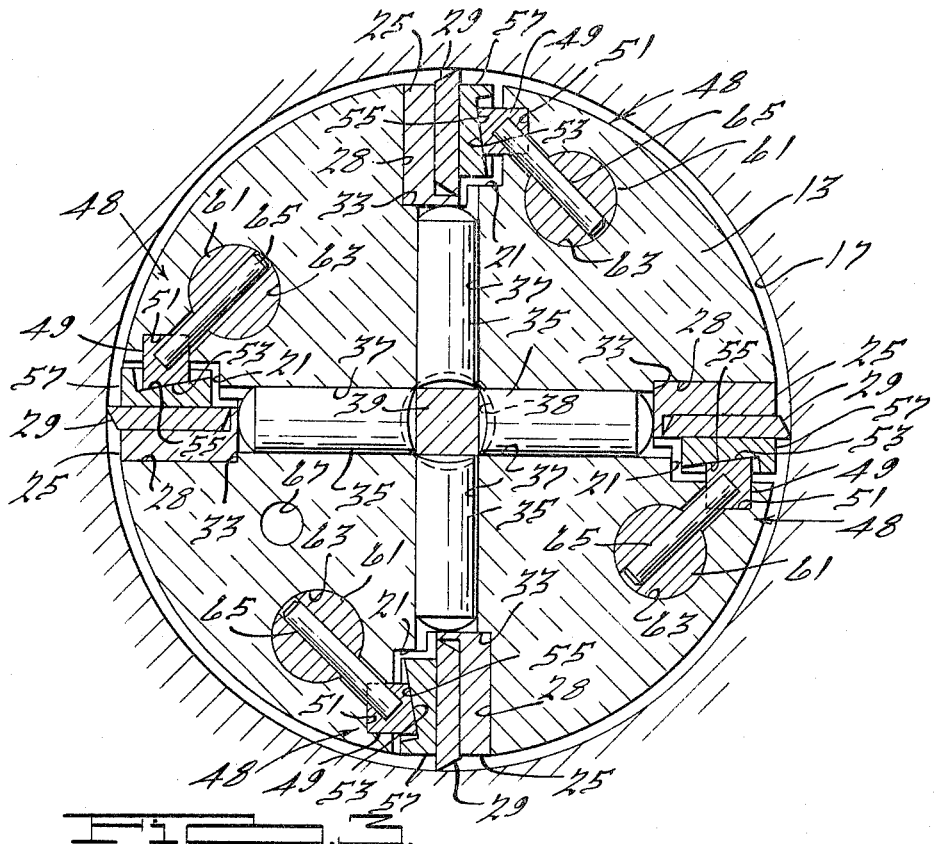
INVENTOR.
Albin S. Czubak
BY
Harness, Dickey & Pierce
ATTORNEYS

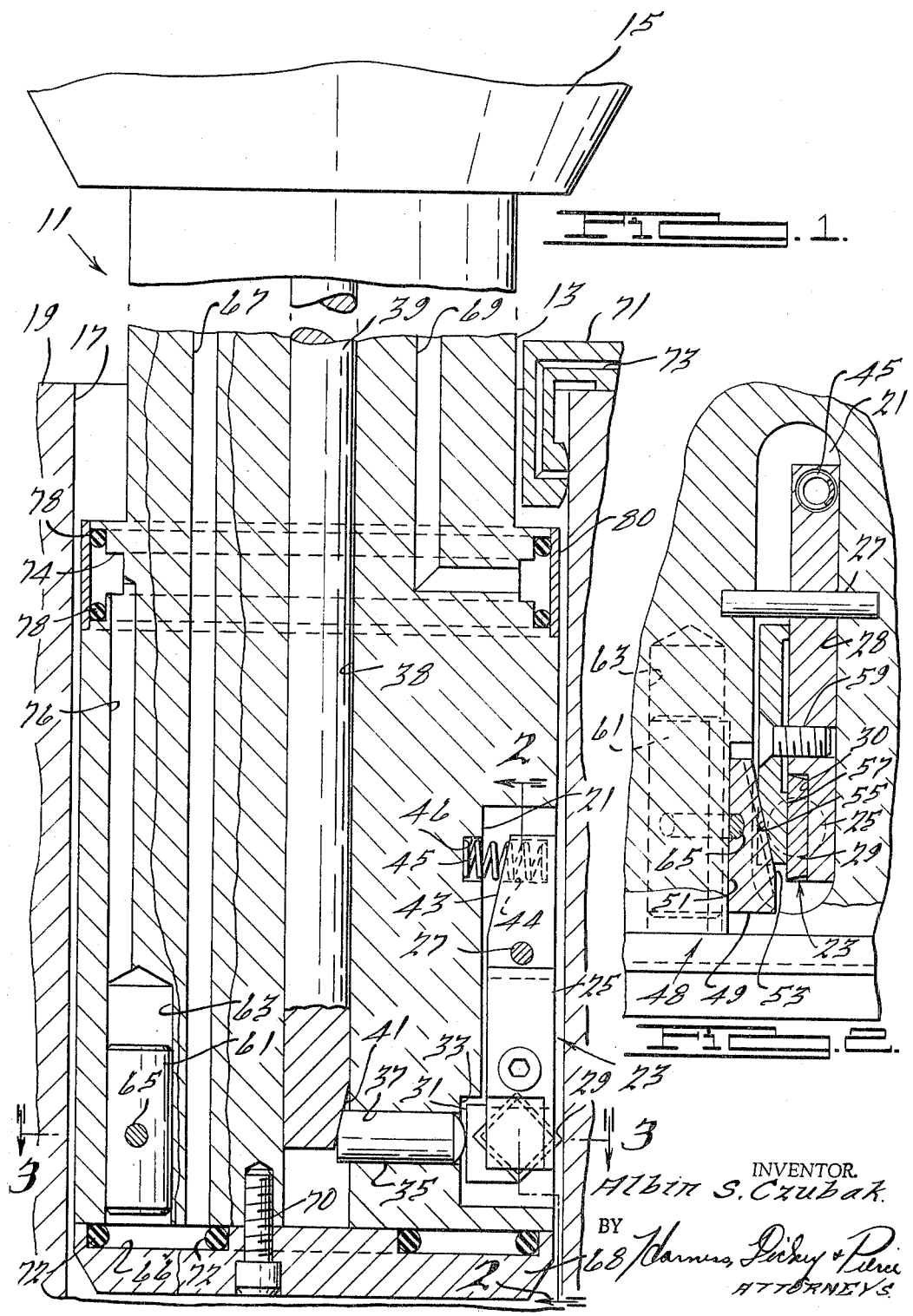

United States Patent Office 3,274,861
Patented Sept. 27, 1966

3,274,861
EXPANDABLE ROTARY BORING TOOL
Albin S. Czubak, Detroit, Mich., assignor to Micromatic Hone Corporation, Detroit, Mich., a corporation of Michigan
Filed Oct. 8, 1964, Ser. No. 402,503
8 Claims. (Cl. 77—58)

This invention relates generally to boring tools, and particularly to an expandable rotary boring tool assembly having an improved controlled tool positioning and positive locking device associated therewith.

The boring tool assemblies to which the present invention relates include those carried by an elongated spindle adapted for rotation about and reciprocation along a longitudinal axis and within a workpiece bore. One or a plurality of tool holders each having a boring tool removably carried thereby are positioned adjacent the spindle outer periphery and are adjustable radially thereof periodically during the boring operation to determine the amount of stock to be removed from a workpiece bore.

Boring tool assemblies of this type as well as the various devices for expanding and locking the tools thereon are well known and have been used with some success in the metal working arts. Generally, these tool assemblies include one or a plurality of elongated rods slidably disposed within the tool spindle and provided with finished frusto-conical surfaces adapted to engage the tool holders and accurately expand them radially of the tool spindle with longitudinal rod movement. Suitable springs are generally provided to retract the tool holders radially as the expanding rods are returned.

One of the problems in this type of boring tool assembly is that during the boring operation, it is necessary that the tools remain properly positioned radially of the spindle and undergo periodic adjustment as the boring progresses. To effect this, it is common to permit the conical surfaces of the rod or rods to remain in contact with the tool holders which causes the forces directed radially inwardly of the tool spindle and imposed on the tools during the boring operation to be absorbed directly by these conical surfaces. After extended tool use, these conical portions may become severely marred and may, therefore, require replacement since the accuracy of tool adjustment depends upon the accuracy of these surfaces.

The device of the present invention includes an adjusting and positive locking device for expandable boring tools of the aforementioned type adapted to overcome the above problems. Additionally, both the adjusting and locking devices are designed for actuation automatically directly in response to a bore sizing gauge or they may, if desired, be manually controlled.

It is an object, therefore, of the present invention to provide an improved adjusting and locking device for expandable boring tools wherein the tools are locked independently of the adjusting device.

It is a further object of the present invention to provide an expandable boring tool assembly having an improved adjusting and locking device of the above character which may be operable in direct response to the bore size and is adapted for actuation with each tool pass.

It is a further object of the present invention to provide an improved adjusting and locking device for an expandable boring tool assembly of the above type which is self-contained and wherein the components thereof are easily replaceable.

It is a further object of the present invention to provide an improved adjusting and locking device for an expandable boring tool assembly of the above character wherein torsional twisting forces developed during the boring operation are absorbed by the spindle.

It is a further object of the present invention to provide an improved tool adjusting and locking device of the above character adapted for use with a variety of expandable rotary tools.

It is still a further object of the present invention to provide an improved adjusting and locking device for an expandable boring tool assembly of the above character which is relatively inexpensive to manufacture, rugged in construction and reliable in use.

Further objects and advantages of the present invention will become more apparent from the following detailed description taken in conjunction with the drawings in which:

FIGURE 1 is a fragmentary sectional view of an expandable boring tool embodying the principles of the present invention;

FIG. 2 is a fragmentary sectional view of the structure of FIG. 1 taken along the line 2—2 thereof;

FIG. 3 is a sectional view of the structure of FIG. 1 taken along the line 3—3 thereof;

FIG. 4 is a fragmentary sectional view of a modified form of expanding cone assembly; and FIG. 5 is a sectional view of the structure of FIG. 4 taken along the line 5—5 thereof.

Broadly described, the present invention includes a releasable locking wedge axially movable within a rotary tool spindle for engagement with a complementary tapered surface on a radially aljustable tool assembly. The wedge is selectively actuated to release the tool assembly when radial adjustment is required and thereafter is moved to lock the tool assembly in its adjusted position.

Referring now more specifically to the drawings, and especially FIGS. 1–3, an expandable boring tool generally indicated at 11 is seen to include an elongated tool spindle 13 adapted to be drivingly connected to an output member 15 of a conventional boring machine rotating and reciprocating drive source (not shown). The tool spindle, therefore, is adapted for rotation about and axial reciprocation along a longitudinally extending axis thereof and within a generally cylindrical bore 17 formed in a workpiece 19.

The tool spindle 13 is formed at one end, remote from the output member 15 with one or a plurality of axially extending slots 21 in the outer periphery thereof, each of which is adapted to receive a boring tool assembly generally indicated at 23. In the device illustrated, four such slots and tool assemblies are shown; however, it is to be understood that this number can be varied to meet individual needs. Each of the tool assemblies 23 and their mountings are identical and a detailed description of one will suffice here.

The tool assembly 23 shown in detail in FIGS. 1 and 2 is seen to include an elongated tool holder 25 pivotally mounted at an intermediate portion thereof within slot 21 by a pivot pin 27 and engaging one side edge 28 of the slot 21. One end of the tool holder 25 adjacent the end portion of the spindle 13 is provided with a notch 30 removably retaining a boring tool 29 therein with a portion thereof positioned radially outwardly of the tool holder and the periphery of spindle 13.

The radial inward edge of the tool holder 25 at this one end is formed with a radially inwardly extending shouldered portion 31 received in a recess 33 formed in slot 21. A piston member 35 is slidably disposed in a radial opening 37 formed in the spindle adjacent the recess 33. As shown, the spindle 13 is provided with an axial opening 38 adapted to slidably receive an expanding rod 39. One end of this expanding rod is preferably formed with a conical surface 41 positioned to engage the inner radial end of the piston 35 and is adapted to move it radially outwardly with axial movement of the expanding rod. The other end of the expanding rod 39 is attached to a conventional tool expansion control device (not shown), the operation of which will be hereinafter described. Thus, as the expanding rod 39 is moved in a downward axial direction, as viewed in FIG. 1, the conical surface 41 engages and moves the piston 35 radially outwardly of the spindle 14. The other end of piston 35 is positioned to engage the shouldered portion 31 of the tool holder 25 and pivots the tool holder counterclockwise about pin 27 as viewed in the figure. Tool holder 25 is cut away or tapered at 43 to permit this pivotal movement and as the tool holder pivots, the tool 29 moves radially outwardly of the spindle 13. A suitable compression spring 45 has one end positioned within a recess 44 formed in the end of the tool holder 25 spaced from the tool 29 and the other end in a recess 46 formed in the slot 21. Thus, when the expanding rod 39 moves in an upward axial direction as viewed in FIG. 1, the conical surface 41 moves away from the piston 35 and spring 45 returns the tool holder 25 to its retracted position by clockwise pivotal movement thereof about pin 27.

When the tool spindle is rotated and reciprocated within the cylindrical bore 17 and the tools 29 expanded into cutting engagement therewith, a substantial reaction force is generated back through the tool assembly both radially inwardly of the tool spindle 13 and circumferentially thereof. For the reason that each of the tool holders 25 abuts the wall 28, all of the circumferential forces are absorbed thereby. However, to prevent the radial inwardly directed force on the tool assembly from being exerted back through the piston 35 and upon the conical surface 41 of expanding rod 39, and to securely maintain the tool holders in their expanded positions, there is provided a positive tool locking assembly forming a part of this invention and indicated generally at 48.

As best seen in FIGS. 2 and 3, this tool locking means includes a wedge 49 slidably disposed along a second generally radially extending wall 51 of each of the slots 21. This wedge 49 is shown as having a longitudinally tapered surface 53 positioned to engage a complementary tapered surface 55 formed on a plate 57 suitably attached to each of the tool holders 25 such as by screws 59. The plate 57, along with forming a part of the tool locking assembly, serves to retain the tool 29 within the notch 30. A piston member 61 is slidably disposed in a bore 63 formed in the spindle 13 adjacent each of the slots 21 and each of these pistons is rigidly attached to a respective one of the wedges 49 by a pin member 65. One end of each of the bores 63 communicates with a first fluid passage 67 through an annular recess 66 formed in a removable spindle end portion 68. This end portion 68 is fixed to the spindle 13 by screws 70 and is provided with a pair of conventional O-rings 72 to form a fluid seal between the spindle end portion and the spindle 13. The other end of bore 63 communicates with a second passage 69 through an annular recess 74 and a passage 76. A second pair of O-rings 78 prevent the loss of fluid pressure at the recess 74 and are retained in place by a sleeve 80 snugly fitted on the spindle 13. A fluid pressure control system (not shown) is adapted to alternately supply fluid under pressure to the passages 67 and 69, respectively. Thus, when fluid under pressure is supplied to the passage 67, piston 61 and wedge 49 is moved in an upward axial direction and the tool holder 25 is positively locked against pivotal movement. Thereafter, during the boring operation, all of the radially inwardly directed forces on the tool assembly are absorbed by the locking assembly 48 and none are inflicted on the expanding rod 39. Fluid under pressure supplied to passage 69 moves the piston 61 and wedge 49 in a downward axial direction thereby releasing the wedge surfaces 53 and 55 and the tool holder 25 for either pivotal expansion by rod 39 and piston 35 or retraction by spring 45.

The tool expanding and locking device of the present invention is designed for manual control, automatic control to a predetermined sequence, or automatic control in direct accordance with the bore size. In other words, the machine operator may expand and lock the tools on the spindle in a specified position to perform a boring operation. On the other hand, an automatic control system may be incorporated to expand and lock the tool holders a predetermined amount at the completion of each tool stroke; or, the tool expanding and locking structure may be controlled, if desired, in direct relation to a bore sizing gauge carried by the tool spindle. Bore sizing gauges of this type are known and commercially available and are adapted for entry into the workpiece bore with each tool stroke. A mechanical or pneumatic device may be provided on the gauge and adapted for actuation in accordance with the bore size. Accordingly, if the bore has been enlarged to a preselected size, sensing thereof by the bore gauge is used to initiate expansion of the tool holders by the expanding rod 39 of the present invention. At the same time, the tool holder locking device is designed for movement to its unlocking position to permit adjustment of the tool holder and after tool adjustment, the locking device is moved to its locking position.

A typical bore sizing gauge which may be used in accordance with the above sequencing is that shown partially in FIG. 1 at 71. This gauge is carried directly into the workpiece bore 17 with axial movement of the spindle 13 during each tool pass and is provided with an air outlet opening 73 therethrough. During the time the gauge is within the bore, air under pressure is directed through the opening 73 and against the wall of bore 17. As the bore size increases, the resistance to emission of the air from opening 73 decreases since the bore wall moves further away. This condition is then used to control tool expansion by initiating movement of the expanding rod and tool holder locking devices as above described.

The number of tools disposed on the tool spindle and the specific circumferential location thereof will vary according to particular needs and desires. The construction shown in FIGS. 1-3 is adapted for use with one or a plurality of tools circumferentially spaced around the spindle periphery, the expanding rod 39 acting to expand all of the tool holders and tools simultaneously. However, if it be desired to control tool expansion independently for each tool, the configuration shown in FIGS. 4 and 5 can be used. In this construction, a plurality of expanding rods 139, one for each tool holder, are mounted for slidable movement in axially extending openings 137 formed in a spindle 111. Each of the rods 139 is formed at one end with a conical portion 141 adapted to engage and move a respective piston 135 radially outwardly. Each of these pistons is, in turn, adapted to engage a tool holder in the same fashion as does the piston 35 in the device of FIGS. 1-3. Each of the expanding rods 139 is adapted for controlled movement, either independently or together, by a control device (not shown) and in a manner similar to the device of FIGS. 1-3. Also, the details of the tool holder and locking construction of the device of FIGS. 4 and 5 is the same as that of FIGS. 1-3 except that in FIGS. 4 and 5, the tool locking devices may be separately controlled.

By the device of the present invention, therefore, there has been provided a very effective and reliable adjusting and locking device for an expandable boring tool assembly, and while preferred embodiments of the present invention have been illustrated and described in detail above, various additions, substitutions, modifications and omissions may be made thereto without departing from the spirit of the invention as encompassed by the appended claims.

What is claimed is:

1. In an expandable boring tool including a drive spindle rotatable about a longitudinal axis and reciprocable therealong, at least one boring tool assembly pivotally carried by said spindle for movement about an axis normal to said longitudinal axis and disposed adjacent the periphery thereof,
means for pivotally adjusting said boring tool assembly radially of said spindle including a rod movable axially within said spindle and having a longitudinally tapered surface operatively engaging said tool assembly,
and releasable locking means for said tool assembly,
said locking means including a wedge member movable axially within said spindle and engageable with a complementary shaped wedge surface formed on said tool assembly.

2. In an expandable boring tool including a drive spindle rotatable about a longitudinal axis and reciprocable therealong,
at least one boring tool assembly pivotally disposed on said spindle adjacent the periphery thereof for movement about an axis normal to said longitudinal axis and having a boring tool fixed thereto for movement radially of said spindle with pivotal movement of said assembly,
means for pivoting said boring tool assembly including a rod movable axially within said spindle and having a longitudinally tapered surface operatively engaging said tool assembly,
and releasable locking means for said tool assembly,
said locking means including a wedge movably disposed for axial movement within said spindle and engageable with a complementary shaped wedge surface formed on said tool assembly.

3. In an expandable boring tool including a drive spindle rotatable about a longitudinal axis and reciprocable therealong,
at least one axially extending slot formed in said spindle,
a boring tool assembly pivotally disposed within said slot adjacent the spindle periphery thereof for movement about an axis normal to said longitudinal axis and having a boring tool fixed thereto for movement radially of said spindle with pivotal movement of said assembly,
means for pivoting said boring tool assembly including a rod movable axially within said spindle and having a longitudinally tapered surface operatively engaging said tool assembly,
and releasable locking means for said tool assembly,
said locking means including a wedge movably disposed within said spindle for axial movement therewithin and engageable with a complementary shaped wedge surface formed on said tool assembly.

4. In an expandable boring tool including a drive spindle rotatable about a longitudinal axis and reciprocable therealong,
a plurality of axially extending slots formed in said spindle and equidistantly spaced therearound,
boring tool assemblies pivotally disposed within each said slot adjacent the spindle periphery thereof for movement about axes normal to said longitudinal axis and each having a boring tool fixed thereto for movement radially of said spindle with pivotal movement of said assemblies,
means for pivoting said boring tool assemblies including a rod movable axially within said spindle and having a longitudinally tapered surface operatively engaging said tool assemblies,
and releasable locking means for each of said tool assemblies,
each of said locking means including a wedge movably disposed within said spindle for axial movement there-within and engageable with a complementary shaped wedge surface formed on each said tool assembly.

5. In an expandable boring tool including a drive spindle rotatable about a longitudinal axis and reciprocable therealong,
at least one boring tool assembly pivotally disposed on said spindle adjacent the periphery thereof and having a boring tool fixed thereto for movement radially of said spindle with pivotal movement of said assembly,
means for pivoting said boring tool assembly including a rod movable axially within said spindle and having a longitudinally tapered surface operatively engaging said tool assembly,
releasable locking means for said tool assembly,
said locking means including a wedge disposed within said spindle and engageable with a complementary shaped wedge surface formed on said tool assembly,
and means for moving said wedge longitudinally within said spindle including fluid actuated means.

6. In an expandable tool including a drive spindle rotatable about a longitudinal axis and reciprocable therealong,
a plurality of slots formed in said spindle and equidistantly spaced therearound,
boring tool assemblies pivotally disposed within each said slot adjacent the spindle periphery thereof and each having a boring tool fixed thereto for movement radially of said spindle with pivotal movement of said assemblies,
means for pivoting said boring tool assemblies including a rod movable axially within said spindle and having a longitudinally tapered surface operatively engaging said tool assemblies,
releasable locking means for each of said tool assemblies,
each of said locking means including a wedge disposed within said spindle and engageable with a complementary shaped wedge surface formed on each said tool assembly,
and means for moving each said wedge longitudinally within said spindle including fluid actuated means.

7. In an expandable tool adapted to bore a generally cylindrical workpiece including a drive spindle rotatable about a longitudinal axis and reciprocable therealong,
at least one boring tool assembly pivotally disposed on said spindle adjacent the periphery thereof and having a boring tool fixed thereto for movement radially of said spindle with pivotal movement of said assembly,
means for pivoting said boring tool assembly including a rod movable axially within said spindle and having a longitudinally tapered surface operatively engaging said tool assembly,
bore gauging means adapted for movement within said bore during the boring operation,
releasable locking means for said tool assembly,
said locking means including a wedge disposed within said spindle and engageable with a complementary shaped wedge surface formed on said tool assembly,
and means for moving said wedge longitudinally within said spindle in response to a signal from said bore gauging means to release said tool assembly for radial adjustment,
said wedge moving means including a fluid actuated piston operatively connected to said wedge.

8. In an expandable tool adapted to bore a generally cylindrical workpiece including a drive spindle rotatable about a longitudinal axis and reciprocable therealong,
a plurality of slots formed in said spindle and equidistantly spaced therearound,
boring tool assemblies pivotally disposed within each said slot adjacent the spindle periphery thereof and each having a boring tool fixed thereto for movement radially of said spindle with pivotal movement of said assemblies,
means for pivoting said boring tool assemblies including a rod movable axially within said spindle and having a longitudinally tapered surface operatively engaging said tool assemblies, bore gauging means adapted for movement within said bore during the boring operation, releasable locking means for each of said tool assemblies, each of said locking means including a wedge disposed within said spindle and engageable with a complementary shaped wedge surface formed on each said tool assembly, and means for moving each said wedge longitudinally within said spindle in response to a signal from said bore gauging means to release said tool assemblies for radial adjustment, said wedge moving means including a fluid actuated piston operatively connected to each said wedge.

References Cited by the Examiner

UNITED STATES PATENTS

| 1,066,878 | 7/1913 | Blocksom. |
| 1,146,665 | 7/1915 | Strom et al. |
| 2,533,451 | 12/1950 | Ginsburg. |

FOREIGN PATENTS

| 255,282 | 7/1926 | Great Britain. |

WILLIAM W. DYER, Jr., *Primary Examiner.*

G. A. DOST, *Assistant Examiner.*